United States Patent [19]

Picchi et al.

[11] Patent Number: 4,547,889
[45] Date of Patent: Oct. 15, 1985

[54] AUTO-ORTHOGONALIZING SYSTEM OF EQUALIZATION ADAPTED TO A RANGE OF DISCRETE FREQUENCIES AND EQUALIZER WHICH ACTIVATES THE SYSTEM

[75] Inventors: Giorgio Picchi, Sarzana; Giancarlo Prati, Pisa, both of Italy

[73] Assignee: Consiglio Nazionale Delle Ricerche, Rome, Italy

[21] Appl. No.: 503,357

[22] Filed: Jun. 10, 1983

[30] Foreign Application Priority Data

Jun. 11, 1982 [IT] Italy ................. 84124 A/82

[51] Int. Cl.⁴ ............................. H04B 1/10
[52] U.S. Cl. ..................... 375/15; 364/825; 333/28 R
[58] Field of Search ............ 375/15, 14; 364/825, 364/572, 724; 333/28 R, 166, 167, 18

[56] References Cited

U.S. PATENT DOCUMENTS

| | | | |
|---|---|---|---|
| 3,864,632 | 2/1975 | Chang | 375/12 |
| 4,021,738 | 5/1977 | Gitlin et al. | 375/14 |
| 4,027,258 | 5/1977 | Perreqult | 375/12 |
| 4,430,743 | 2/1984 | Watanabe | 375/13 |

OTHER PUBLICATIONS

R. D. Gitlin and F. R. Magee, Jr., "Self-Orthogonalizing Adaptive Equalization Algorithms", *IEEE Transactions on Communications*, vol. Com-23, No. 7, Jul. 1977.

Giorgio Picchi & Giancarlo Prati, "Self-Orthogonalizing Adaptive Equalization in the Discrete Frequency Domain", *IEEE Transactions on Communications*, vol. Com-32, No. 4, Apr. 1984.

*Primary Examiner*—Robert L. Griffin
*Assistant Examiner*—Timothy K. Greer
*Attorney, Agent, or Firm*—Kimmel, Crowell & Weaver

[57] ABSTRACT

The adaptive auto-orthogonalizing equalizer in the discrete frequency domain comprises a filter with N cells operating by the overlap-save method, a decision element which assigns one of the possible levels to the filtered samples, and a control circuit which at each iteration varies the cell gains on the basis of the input samples, the output samples and the decided symbols, and which comprises an estimator ($S_A$) for estimating the gradient of the mean square error, an estimator ($S_B$) for estimating a matrix which modifies said gradient such that its direction always passes as close as possible to the minimum to be sought, a projector ($P_S$) for projecting said corrected gradient into a constraint region, and a circuit for adjusting the filter cell gain vector at each iteration.

6 Claims, 2 Drawing Figures

AUTO-ORTHOGONALIZING SYSTEM OF EQUALIZATION ADAPTED TO A RANGE OF DISCRETE FREQUENCIES AND EQUALIZER WHICH ACTIVATES THE SYSTEM

FIELD OF THE INVENTION

This invention relates to an adaptive auto-orthogonalising equalization system in the discrete frequency domain, and an equalizer for effecting the system.

BACKGROUND OF THE INVENTION

In synchronous data transmission systems, equalizers are provided for attenuating the intersymbol interference effects (see Lucky R. W., "Automatic equalization for digital communication", Bell Syst. Tech., J., 1965, 44, pp. 574-588), i.e. the undesirable effects of each symbol on the others due to the non-ideality of the frequency response of the transmission channel.

In particular, transversal filter equalizers operating in the time domain are known. They consist of a tapped delay line, i.e. a chain of delay elements. At the output of each delay element there is provided a variable gain multiplier (cell grain). The multiplier outputs are added to provide a sample on which the decision regarding the transmitted symbol is made. The decision element output constitutes the so-called decided signal, which, assuming no errors, should be equal to the signal fed into the channel.

The choice of the total cell gains defines the performance of the equalizer. If this gain total is fixed and constant, then the equalizer is a fixed equaliser, whereas if this total is variable by being adapted to the transmission channel characteristics, the equalizer is an adaptive equalizer. There are also "preliminary" equalisers, ie. able to be adapted to the channel characteristics, and, once adapted, to maintain the gain total fixed and constant.

The present invention relates to adaptive equalizers.

The criterion of gain total adaptation is to minimise the mean square value of the difference between the samples at the equalizer output (before the decision) and the corresponding decided signals (means square error). For a given channel, the mean square error is a function of the total gain of the multipliers. In practice, the mean square error is minimized in the following manner: the gain values are chosen (initially in an arbitrary manner, then gradually adjusting as suitable); with this configuration, non-zero differences between the output samples and the corresponding decided symbols are obviously found at the equalizer output. Using these differences together with the signals present at the equalizer input, the gains are modified so as to attain a minimum mean square error. It can be shown that this configuration exists, and is unique (see Gersho A., "Adaptive equalization of highly dispersive channels for data transmission", Bell Syst. Tech. J. 1969, 48 pp. 55-70).

The mean square error is minimised by estimating its gradient on the basis of the input sequence, the output sequence and the decided sequence, and the gains are modified in the opposite direction to the gradient.

If the surface which defines the mean square error (which can be likened to a paraboloid) is round, the gradient is always directed towards the point corresponding to the minimum means square error. However, if this curve is somewhat "squashed", this is not true.

A problem present in known adaptive equalizers is to rapidly attain the minimum mean square error configuration (optimum configuration), and auto-orthogonalizing equalizers have already been proposed for this purpose (see Gitlin R. D., Ho E. Y., Mazo J. E., "Passband equalization of differentially phase-modulated data signals", Bell Syst. Tech. J. 1973, 52, pp. 219-298). The principle of auto-orthogonalization consists of transforming coordinates so that the surface representative of the mean square error is transformed into a round surface, i.e. so that the auto-values of the matrix which defines it all become equal. This theoretically allows convergence to the optimum configuration in a single iteration (correction). In practice, the estimated gradient is premultiplied at each iteration by suitable matrices so that the direction of the thus modified vector always passes through the minimum which is being sought.

The adaptive auto-orthogonalizing equalisers of the type briefly described operate in the time domain, i.e. they operate directly on the time samples of the signals received.

There are also adaptive equalizers which operate in the discrete frequency domain, ie which operate on the discrete Fourier transforms of sample blocks (see Corsini P., Picchi G., Prati G. "Adaptive equalization of discrete channels via fast convolution techniques", IEE Proc., Part E, 128, pp. 239-244 Nov. 1981). Compared with equalizers operating in the time domain, adaptive equalizers of this type have considerable advantages both because of the simplification which they enable in the filtering operations, and because of the possibility of using the sample transforms for other subsequent processing operations (decoding, synchronisation etc.).

SUMMARY OF THE INVENTION

The object of the invention is to propose an adaptive auto-orthogonalizing equalization system in the discrete frequency domain. This object is attained according to the invention by an adaptive auto-orthogonalizing system in which the overlap-save method is used to filter blocks of input data, a decision is made regarding the level to be assigned to each filtered sample of this sequence, and a calculation is then effected in which at each iteration corresponding to the successive reception of input data blocks, the discrete Fourier transform of the input sample vector, the filtered sample sequence and the decided symbol sequence are checked, and the filter cell gains are correspondingly varied, characterized in that during the control stage;

a vector is estimated which is proportional to the gradient of the mean square value of the difference between the filter output samples and the corresponding decided symbols (mean square error), a matrix is estimated by which to multiply the vector obtained by the preceding estimation, in order to transform it into another vector of which the direction passes as close as possible to the point corresponding to the absolute minimum of the cell gain vector function, this representing the mean square error if said cell gain vector is the discrete Fourier trasform of a real vector, and the cell gain vector is adjusted by subtracting from it a vector proportional to said vector.

The invention relates to an adaptive auto-orthogonalizing equalizer comprising:

a filter with N cells operating in the discrete frequency domain by the overlap-save method, a decision element which receives the sequence of filtered samples and assigns one of the possible levels to them, a control circuit which at each iteration corresponding to the successive reception of the input data blocks receives the discrete Fourier transform of the input sample vector, the filtered sample sequence and the decided symbol sequence, and uses them in order to vary the gains of the filter cells, and characterized in that the control circuit comprises:

an estimator for estimating a vector proportional to the gradient of the mean square value of the difference between the samples at the filter output and the corresponding decided symbols (mean square error), an estimator for estimating a matrix by which to multiply the estimated vector in order to transform it into another vector of which the direction passes as close as possible to the point corresponding to the absolute minimum of the cell gain vector function, which represents the mean square error if said cell gain vector is the discrete Fourier transform of a real vector, and a circuit for adjusting the cell gain vector, which subtracts from said vector a vector proportional to said vector.

Advantageously the equalizer according to the invention may comprise, an estimator for estimating a vector proportional to the gradient of the mean square value of the difference between the samples at the filter output and the corresponding decided symbols (mean square error), an estimator for estimating a matrix by which to multiply the estimated vector in order to transform it into another vector of which the direction passes as close as possible to the point corresponding to the absolute minimum of the cell gain vector function, which represents the mean square error if said cell gain vector is the discrete Fourier transform of a real vector with $N-M$ final zeros, M being the number of cells of the filter operating in the time domain and equivalent to the filter under examination, a projector which receives as input the vector represented by the product of the estimated matrix and the estimated vector, and which supplies as output a vector which is the transform of a real vector with $N-M$ final zeros, a circuit for adjusting the cell gain vector, which subtracts from said vector a vector proportional to the projected vector.

The estimator for estimating the matrix advantageously may comprise an accumulation circuit for the vectors corresponding to the successive iterations and having the squared modules of the vector transform samples of the input samples as components, and a circuit which transforms the output vector of the accumulation circuit into a vector in which the elements are the reciprocals of the elements of the preceding multiplied by $K+1$, K being the progressive number of the input sample blocks and thus the order number of the successive iterations.

BRIEF DESCRIPTION OF THE DRAWINGS

A preferred embodiment of the present invention is described in detail hereinafter by way of non-limiting example, with reference to the accompanying drawings in which.

DETAILED DESCRIPTION OF A PREFERRED EMBODIMENT

Figure 1:
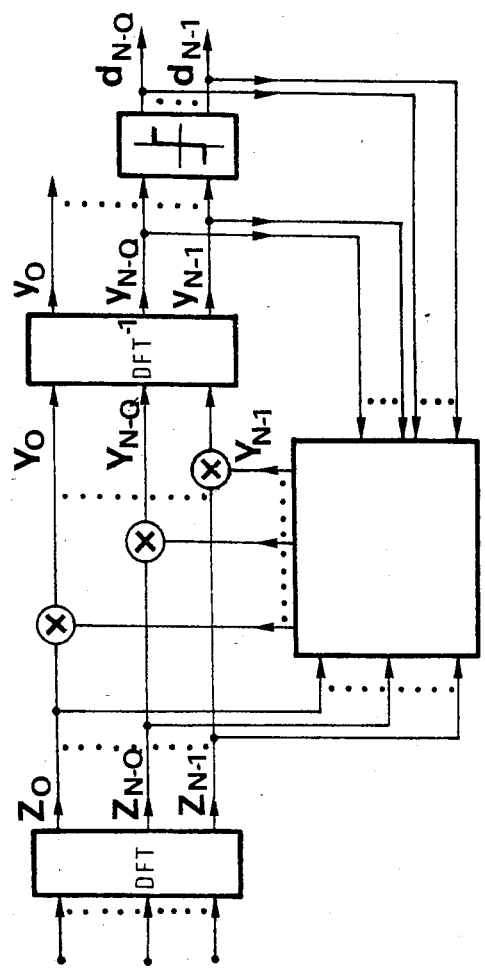
FIG. 1 is a general block diagram of the adaptive equalizer according to the invention.

As can be seen from the figures, the basic structure of an adaptive equalizer according to the invention operating in the discrete frequency domain (DFD) is shown diagrammatically in FIG. 1. Generally, the adaptive equalizer is formed from two main parts:

a variable parameter digital filter of which the purpose is to filter the received samples in such a manner as to reduce intersymbol interaction, and a filter parameter control system, of which the purpose is to modify said parameters in successive steps, in order to reach the optimum configuration (minimum mean square error) in the shortest possible time.

More particularly, the present invention relates to the control system for a filter operating in the discrete frequency domain and described in the aforesaid work of Corsini, Picchi and Prati. The assembly of parameters which is guided towards its optimum configuration is the vector of the total N cell gains, which after the Kth correction will be indicated by $C^{(k)}$.

The optimum vector is that which minimises the means square error, of which the expression is as follows:

$$\epsilon = C^T A \bar{C} - (B^T \bar{C} + C^T \bar{B}) + K \tag{1}$$

where:
K is a constant
A is the matrix $N \times N$ defined by $$A = (N^3/Q_s) E\{\text{Diag } \bar{Z}_k \bar{P} \text{ Diag } Z_k\} \tag{2}$$

with $$P = W \left( \begin{array}{cc} \text{Diag } 0 \ldots 0 & 1 \ldots 1 \\ \underbrace{\phantom{xxxx}}_{N-Q_s} & \underbrace{\phantom{xxxx}}_{Q_s} \end{array} \right) W^{-1}$$

and $$W(i,k) = \exp(2\pi i k \sqrt{-1/N})$$

B is the vector such that $$B^T = (N^2/Q_s) E\{D_k \text{ Diag } Z_k\}$$

$Q_s$ is a number previously chosen such that $$1 \leq Q_s \leq N - M + 1$$

$M \leq N$ (also previously chosen) is the number of cells of the filter operating in the time domain and equivalent to the filter under examination, $Z_k$ is the discrete Fourier transform (DFT) of the vector of N samples present after the kth iteration, at the filter input, $D_k$ is the DFT of the vector formed by $N-Q_s$ zeroes followed by the last $Q_s$ decided symbols.

Minimization of the mean square error (mse) is effected by the iterative process, by adjusting the vector C in the following manner:

$$C^{(k+1)} = C^{(k)} - (\tfrac{1}{2}) \alpha P(\phi)(\phi \phi^H) (\widehat{\nabla \epsilon})_k \tag{3}$$

in which $$(\hat{\nabla}\epsilon)_k = (2N^2/Q_s) \text{ Diag } \bar{Z}_k E_k \quad (4)$$

where $E_k$ is the DFT of the vector formed by $M-1$ zeroes followed by the differences between the final $Q_s$ samples of the filter output vector, when this has the configuration $C^{(k)}$, and the corresponding decided symbols, $\phi$ is an arbitrary matrix such that $\phi\phi^{-1} = W^2/N$ $P(\phi)$ is a suitable projection matrix depending on the choice of $\phi$ necessary for the operation of the DFT filter, and defined by $$P(\phi) = \phi\{1 - G(\phi)[G^T(\phi)G(\phi)]^{-1}G^T(\phi)\}\phi^{-1}$$

(see the aforesaid work of Corsini P., Picchi G., and Prati G.). Given the arbitrary nature of $\phi$, $\phi$ need only be chosen equal to $\phi_t$ such that $\phi_t\phi_t{}^M = \xi I$ ($\phi^H$ is the transposed conjugate matrix of the matrix $\phi$, i.e. $\phi^H = \bar{\phi}^T$).

It can be shown that the multiplication by $P(\phi_t)$, i.e. by the particular matrix $P(\phi)$ obtained when $\phi = \phi_t$, can be substituted by the following succession of operations: antitransforming the vector to be projected, zeroing the last $N-M$ samples, then transforming.

In the case of auto-orthogonalizing equalizers operating in the discrete frequency domain, and assuming transmission channels which do not vary with time and that the stochastic "input data" process is stationary, the matrix A can be expressed in terms of the autocorrelation matrix of the vectors $Z_k$ in the following manner:

$$A = (N^3/Q_s)P \otimes E\{\bar{Z}_k Z_k{}^T\}$$

in which $\otimes$ indicates the product calculated element by element. Because of the arbitrary nature of $\phi$, according to the invention $\phi\phi^H$ is chosen equal to $\bar{A}^{-1}$, and thus:

the matrix $(\phi^H A \phi)$ which defines the form of the mean square error surface of the transformation operated by $\phi$ is identical, indicating that the orthogonalization has been carried out;

the adjustment formula (3) for the vector $C^{(k)}$ becomes (for any K and for $\alpha = 1$)

$$C^{(k+1)} = P(\phi)\bar{A}^{-1}B$$

As it is known that the chosen adjustment formula (3) converges to the optimum vector for $K \to \infty$, (see the aforesaid work of Corsini P., Picchi G. and Prati G.) said optimum vector is $P(\phi)\bar{A}^{-1}B$, and on the basis of the chosen $\phi\phi^H$, this is theoretically attained in a single step independently of the starting vector.

It should however be noted that the theoretical basis for the aforesaid solution presupposes a knowledge of the matrix A, which in fact is unknown and must be estimated on the basis of the data received, and then inverted and conjugated, in order to provide an estimate of the proposed matrix $\phi\phi^H$. Thus if $\hat{A}$ is the estimate for the matrix A:

$$A_k = N^3/Q_s P \times (1/k + 1)\left(A_o + \sum_{j=0}^{k} Z_j Z_j{}^T\right)$$

where $A_o$ is an initialisation matrix which for simplicity is convenient to take as diagonal.

Because of this unknown and the fact that in practice optimisation of the cell gain vector C must be attained by an iterative adjustment process, according to the invention it is preferred to use as the matrix $P(\phi)$ not a matrix corresponding to the particular prechosen matrix, but instead the matrix $P(\phi_t)$ corresponding to the matrix $\phi_t$ used previously, such that $$\phi_t\phi_t{}^H = \xi I$$

It has in fact been found in practice that using $P(\phi_t)$ even if $\phi$ is not equal to $\phi_t$, although being wrong theoretically, is acceptable from the practical point of view because of the fact that the error committed is negligible when compared with the calculation advantages obtainable.

It has also been found experimentally that because of the fact that in practice convergence to the minimum mean square error configuration in a single step is not possible, and thus because of the need for several progressive adjustment stages for the vector C, it is preferable to choose a value of $\alpha$ which is less than 1 for reasons of algorithm stability.

Thus the control system for the auto-orthogonalizing equalizer according to the invention effects the following algorithm:

$$C^{(k+1)} = C^{(k)} - \alpha/2 P(\phi_t)(\hat{A}_k)^{-1}(\hat{\nabla}\epsilon)_k$$

in which the symbols have the aforesaid meanings.

The succession of operations necessary for its accomplishment comprises for each iteration:
the construction of the estimated gradient $(\hat{\nabla}\epsilon)_k$
the construction of $(\phi\phi^H)_k$, i.e. of $(\hat{A}_k)^{-1}$
the projection of $(\phi\phi^H)_k(\hat{\nabla}\epsilon)_k$ by means of $P(\phi_t)$
adjustment of the vector $C^{(k)}$.

Figure 2:
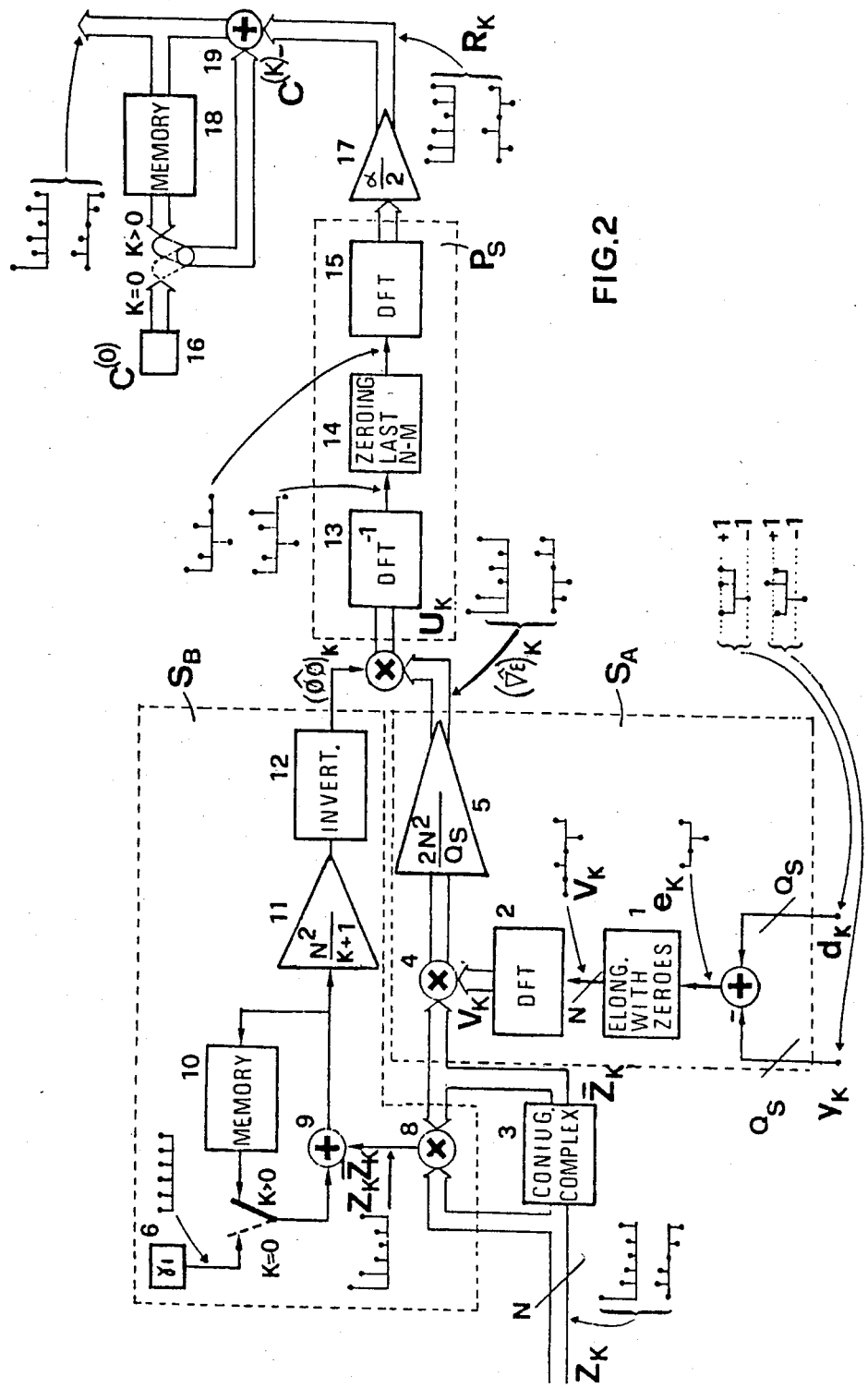
FIG. 2 is a block diagram of its control circuit.

The detailed description of each of these operations is given hereinafter with reference to FIG. 2, in which the following symbols are used:
the dashed lines group together blocks of the adaptive equalizer on the basis of the overall function performed,
the single continuous lines indicate the flow of real numbers,
the double continuous lines indicate the flow of complex numbers (pairs of real numbers).

The example given relates to an iterative process on six input signals (N=6), which during the various stages give rise to real data indicated diagrammatically by a sequence of six small lines, or to pairs of real data (complex data) grouped together by a {.

A. Construction of the Estimated Gradient $(\hat{\nabla}\epsilon)_k$

It can be seen from (4) that the estimated gradient is expressed by $$(\hat{\nabla}\epsilon)_k = (2N^2/Q_s) \text{ Diag } \bar{Z}_k E_k$$

In order to construct $(\hat{\nabla}\epsilon)_k$, the estimator indicated generally by $S_A$ is used, with the following procedure:
the last $Q_s$ output samples from the filter (vector $y_k$) are taken
the corresponding decided symbols (vector $d_k$) are taken
the difference is taken symbol by symbol between the two vectors to obtain an error vector e of $Q_s$ components a vector $v_k$ of N samples is constructed by elongating in 1 the preceding error vector e with $N-Q_s$ zeroes the discrete Fourier transform $V_k$ of this vector $v_k$ is calculated in 2 the DFT of the vector $Z_k$ of M symbols present at the filter input is taken (the vector $Z_k$ is already available because it is necessary for filtering) and its conjugate complex vector $\overline{Z}_k$ is constructed in 3 the vector $Z_k$ is multiplied element by element by the vector $V_k$ in 4 to obtain the vector $X_k$ each element of the vector $X_k$ thus obtained is multiplied in 5 by the numerical factor $(2N^2/Q_s)$ to thus obtain $(\widehat{\nabla\epsilon})_k$.

B. Construction of the Estimated Matrix $(\widehat{\phi\phi^H})_k$

The matrix $(\phi\phi^H)_k$ can be generally constructed in the following manner (not illustrated in the figure, but merely described):

initially, i.e. when $k=0$, it is necessary to set the matrix $A_o$ in one suitable accumulator memory, and the matrix $\overline{P}'$ in another memory, the matrix $\overline{Z}_k Z_K^T$ is constructed element by element, by multiplying each element of the vector $\overline{Z}_k$ by each element of the vector $Z_k$, the elements obtained in this manner are added to the matrix located in the accumulator memory, to obtain a new matrix $M_1$, the new sum is memorised in the same accumulator memory, the matrix $M_1$ is divided by $k+1$ element by element to obtain a matrix $M_2$, the matrix $M_2$ is multiplied by the matrix $P'$ element by element, to obtain a matrix $M_3$, the matrix $M_3$ is multiplied by the factor $N^3/Q_s$ to obtain a matrix $M_4$, the matrix $M_4$ is inverted, and is conjugated to obtain the matrix $(\widehat{\phi\phi^H})_k$ As the minimisation of $\epsilon$ is a problem of minimum constraint search (see the said work of Corsini P., Picchi G. and Prati G.), it is possible to find other expressions for $\epsilon$ corresponding to more easily orthogonalizable surfaces which intersect the given surface in the constraint region.

According to the invention, auto-orthogonalization is obtained with considerable simplification of the calculation of $(\widehat{\phi\phi^H})_k$, if the following expression is chosen for $\epsilon$:

$$\epsilon_w = C^T A_w \overline{C} - 2b_w^T C + K$$

where $$A = K.N^3 \text{Diag } X \text{ Diag } \overline{X}.$$

X being the DFT of $\{x_o \ldots x_{G-1} 000 \ldots 0\}$ and $x_o \ldots x_{G-1}$ being the impulsive response of the truncated channel to the first significant G samples. It can be shown that $\epsilon_w$ intersects $\epsilon$ in the constraint region, and can therefore be used instead of this.

It can also be shown that a good estimate for $A_w$ is $$(A_w)_k = \frac{N^2}{k+1}\left( X_o I + \sum_{j=o}^{k-1} \text{Diag } Z_j \text{Diag } \overline{Z}_j \right)$$

which represents an estimation of the power spectrum of the input sequence to the filter. The auto-orthogonalization is made simple by the fact that $(A_w)_k$ is diagonal, and thus in calculating $(\widehat{\phi\phi^H})_k = \hat{A}_w^{-1}$, the inversion of the matrix $M_4$ simply becomes a series of N complex divisions of type $1/(.)$. In this case, the preceding point B (construction of $(\widehat{\phi\phi^H})_k$) can be simplified in the following manner, illustrated diagrammatically in blocks $S_B$ of FIG. 2:

a vector of N elements all equal to the initialisation value $\gamma_o$ must be set initially, i.e. when $k=0$, in a suitable accumulator memory 6, the vector $Z_k$ is multiplied in 8, element by element, by the vector $\overline{Z}_k$, the elements thus found are added in 9 to the elements present in the accumulator memory 10, the new sum is memorised in the accumulator memory 10, the value found is multiplied in 11 by the factor $N^2/k+1$, each element of the vector found is inverted in 12 by calculating N divisions of type $1/(.)$.

C. Projection of $(\widehat{\phi\phi^H})_k(\widehat{\nabla\epsilon})_k$ By Means of $P(\phi_t)$ This operation is effected in the following manner by the projector indicated generally by $P_s$, which receives as input a vector $U_k$ obtained by multiplying in 12 the matrix $(\widehat{\phi\phi^H})_k$ originating from the estimator $S_B$, by the vector $(\widehat{\nabla\epsilon})_k$ originating from the estimator $S_A$;

the inverse DFT of said vector $U_k$ is calculated in 13, the last $N-M$ samples of the (real) vector thus obtained are zeroed in 14, the DFT of this latter vector is calculated in 15, and the vector $P(\phi_t)(\widehat{\phi\phi^H})_k(\widehat{\nabla\epsilon})_k$ is obtained at the output of the projector $P_s$.

D. Adjustment of the Vector $C^{(k)}$

This operation requires an arbitrary value of $C^{(o)}$ (preferably $C^{(o)}=0$) to be set in a memory 16. Then:

the vector $P(\phi_t)(\widehat{\phi\phi^H})_k(\widehat{\nabla\epsilon})_k$ is multiplied in 17 by the factor $\alpha/2$, to obtain the vector $R_k$, the vector $C^{(k)}$ to be adjusted is withdrawn from the appropriate memory 18 or from the filter, the vector $R_k$ is subtracted from the vector $C^{(k)}$ in 19, to obtain the vector $C^{(k+1)}$, the vector $C^{(k+1)}$ is memorised in 18, and is transferred to the filter for the new filtering operation.

We claim:

1. An adaptive auto-orthogonalizing equalizer operating in the discrete frequency domain, comprising:
    a filter with N cells operating in the discrete frequency domain by the overlap-save method, giving at its output a sequence of filtered samples;
    a decision element, which is serially connected to said filter, to receive the sequence of filtered samples and to assign each of them to the nearest level out of a predetermined levels set (decision);
    a control circuit, which is connected to said filter and to the output of said decision element and at each iteration, corresponding to the successive reception of input data blocks, to receive the discrete Fourier transform of an input sample vector, said filtered sample sequence and a decided symbol sequence, and uses them in order to vary the gains of said filter cells;
    characterized in that said control circuit comprises:
    a first estimator ($S_A$) having its input connected to said filter and to the output of said decision element, and having its output connected to the output of a second estimator ($S_B$) and to the input of a projector ($P_S$), said first estimator ($S_A$) estimating a vector $(\widehat{\nabla \epsilon})_k$ which is proportional to the gradient of the mean square value of the difference between the samples at the filter output and the corresponding decided symbols (mean square error);

a second estimator ($S_B$) having the input connected to the filter and its output connected to the output of said first estimator ($S_A$) and to the input of said projector ($P_S$), said second estimator ($S_B$) estimating a matrix $(\widehat{\phi\phi^H})_k$ by which to multiply the output vector from said first estimator ($S_A$) in order to transform it into another vector of which the direction passes as close as possible to the point corresponding to the absolute minimum of the function of the cell gain vector C, which represents the mean square error if C is the discrete Fourier transform of a real vector with N−M final zeroes, M being the number of cells of the filter operating in the time domain and equivalent to the filter under examination; and a projector ($P_S$) having its input connected with the outputs of said first and second estimators ($S_A$, $S_B$) and having its output connected to a circuit for adjusting the cell gain vector ($C^k$), said projector ($P_S$) receiving as input the vector ($U_k$) represented by the product of the matrix $(\widehat{\phi\phi^H})_k$ and the vector $(\widehat{\nabla \epsilon})_k$ and providing as output a vector which is the transform of a real vector with N−M final zeroes, and a circuit for adjusting the cell gain vector ($C^k$), which subtracts from said vector ($C^k$) a vector ($R_k$) proportional to the output vector from said projector ($P_S$).

2. An equalizer as claimed in claim 1, characterized by said first estimator ($S_A$) being connected to receive as input the sequence of output samples ($y_k$) from the filter and the sequence of decided symbols ($d_k$), and operating to subtract one from the other and, after eventually elongating with zeroes until attaining a vector ($v_k$) of N samples, taking the discrete Fourier transform and multiplying it by the conjugate complex ($\overline{Z}_k$) of the transform ($Z_k$) of the input sample vector.

3. An equalizer as claimed in claim 1, characterized in that the second estimator ($S_B$) comprises an accumulation circuit (10) for the vector corresponding to the successive iterations and having as their components the squared modules of the samples of the input sample vector transform ($Z_k$) and a circuit (11, 12) which effects the transformation of the output vector from the accumulation circuit (10) into a vector of which the elements are the reciprocals of the elements of the preceding vector multiplied by k+1, k being the progressive number of the input sample blocks, and thus the order number of the successive iterations.

4. An equalizer as claimed in claim 1, characterized in that the projector ($P_S$) comprises a circuit (13) which provides the discrete inverse Fourier transform of a vector ($U_k$), a zeroing circuit (14) for the last N−M samples of the real output vector of the circuit (13), and a circuit (15) which effects the discrete Fourier transform of the real output vector of the zeroing circuit (14).

5. An equalizer as claimed in claims 1 or 3, characterized by comprising a circuit (6) which for K=0 provides the accumulation circuit (10) with a predetermined initialization vector.

6. An equalizer as claimed in claims 1 or 4, characterized by comprising a circuit (19) which for k=0 provides the adjustment circuit with a predetermined initialization vector.

* * * * *